United States Patent [19]
Kim et al.

[11] Patent Number: 6,128,302
[45] Date of Patent: Oct. 3, 2000

[54] INTERWORKING METHOD OF TMN MANAGER AND AGENT SYSTEMS FOR PROVIDING THE END-TO-END PERMANENT VIRTUAL CONNECTION SERVICE

[75] Inventors: Tae Wan Kim; Wang Don Woo, both of Daejeon, Rep. of Korea

[73] Assignees: Electronics & Telecommunications Research Institute, Daejeon; Korea Telecommunication Authority, Seoul, both of Rep. of Korea

[21] Appl. No.: 08/986,169

[22] Filed: Dec. 5, 1997

[30] Foreign Application Priority Data

Dec. 6, 1996 [KR] Rep. of Korea ............. 96-62628

[51] Int. Cl.[7] .................................................. H04L 12/28
[52] U.S. Cl. .......................................... 370/397; 370/410
[58] Field of Search .................................. 370/410, 230, 370/397, 399, 409

[56] References Cited

U.S. PATENT DOCUMENTS

| | | |
|---|---|---|
| 5,204,955 | 4/1993 | Kagei et al. . |
| 5,392,402 | 2/1995 | Robrock, II ............. 709/227 |
| 5,459,777 | 10/1995 | Bassa et al. . |
| 5,519,836 | 5/1996 | Gawlick et al. ............. 709/241 |
| 5,613,100 | 3/1997 | Anezaki . |
| 5,896,496 | 4/1999 | Suzuki ............. 395/185.01 |
| 5,959,985 | 9/1999 | Freen et al. ............. 370/351 |

*Primary Examiner*—Chau Nguyen
*Assistant Examiner*—Suibel M. H. Schuppner
*Attorney, Agent, or Firm*—Antonelli, Terry, Stout & Kraus, LLP

[57] ABSTRACT

An interworking method for a telecommunication management network (TMN) manager system and agent systems provide end-to-end permanent virtual path service. The interworking method includes the steps of: building up a database, transferring a connection result to the TMN operator if an originating exchange is the same as a terminating exchange, finding an exchange connecting to a corresponding link and its link number if the originating exchange is different from the terminating exchange, integrating and transferring a result of a received response and information to the TMN operator if the found exchange is the terminating exchange, and repeating the method steps if the found exchange is a transit exchange. The end-to-end permanent virtual connection is setup by an instruction from a TMN operator by accommodating a request for service made by an originating/receiving subscriber.

9 Claims, 3 Drawing Sheets

INTERWORKING METHOD OF TMN MANAGER AND AGENT SYSTEMS FOR PROVIDING THE END-TO-END PERMANENT VIRTUAL CONNECTION SERVICE

BACKGROUND OF THE INVENTION

1. Field of the Invention

The present invention relates to an interworking method of TMN manager and agent systems for providing end-to-end permanent virtual path service.

2. Description of the Prior Art

Heretofore, if the operator of a network center who manages several exchanges finds an originating exchange and a terminating exchange manually with data on a link (trunk) connection between exchanges and data on the present condition of subscriber accommodation, and decides on transit exchanges and originating/receiving links between them and so notifies the operator who manages a corresponding exchange by means of a telephone, the operator of each exchange sets up the connection by looking at his own data and designating the link, the virtual path identifier (VPI) and the virtual channel identifier (VCI) of a corresponding exchange.

However, such a conventional method involves a problem because that it is apt to make an error due to manual operation, it takes much time to set up the connection and it is difficult to confirm the result of entire connection setup.

Moreover, the present telecommunication management network system is not provided with a routing system by automatic translation of subscriber numbers on the originating/receiving sides for end-to-end permanent virtual path service, and it is to designate the originating/receiving links, the virtual path identifier (VPI) and the virtual channel identifier (VCI) of originating/terminating exchanges and transit exchanges.

SUMMARY OF THE INVENTION

The present invention solves such a problem aims to provide an interworking method of telecommunication management network manager system and agent systems which automatizes providing of permanent virtual path service, improves the quality of service and makes it easy to confirm the result of setup by achieving end-to-end permanent virtual connection with one instruction from a telecommunication management network operator through the introduction of a method for setup of SVC (switched virtual connection) which is virtual connection by signalling of ATM (asynchronous transfer mode) exchange into the setup of permanent virtual connection.

In order to attain such object, the present invention comprises: a first step in which a data base is built up by creating subscriber information for those exchanges managed by said telecommunication management network manager system and connection information between said exchanges; second step in which, if a request for permanent virtual connection is received from a telecommunication management network operator, an originating exchange and a terminating exchange are determined by retrieving the data base with originating/receiving subscriber numbers and then it is judged if the receiving/originating exchanges are the same; the third step in which, if the receiving/originating exchanges are the same as a result of judgment in the second step, a request is addressed to an agent system which vicariously manages a corresponding exchange for setup of virtual connection and, if the result of connection is received, it is transferred to the telecommunication management network operator; the fourth step in which, if the originating/terminating exchanges are different as a result of judgment in the second step, a request is addressed to an originating agent system which vicariously manages the originating exchange for setup of virtual connection and, if a response is received, an exchange connected to a corresponding link and its link number are found by retrieving link connection information between the exchanges in the data base with a receiving link number and then it is judged if the found exchange is; terminating exchange; fifth step in which, if it is the terminating exchange as a result of judgment in the fourth step, a request is addressed to a receiving agent system for setup of virtual connection and, if a response is received, the result of the response and information are integrated and transferred to the telecommunication management network operator; and a sixth step in which, if it is not the terminating exchange but the transit exchange as a result of judgment in the fourth step, a request is addressed to a corresponding relay agent system and, if a response is received, repetition is performed from the process of finding the exchange and its link number in the fourth step.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
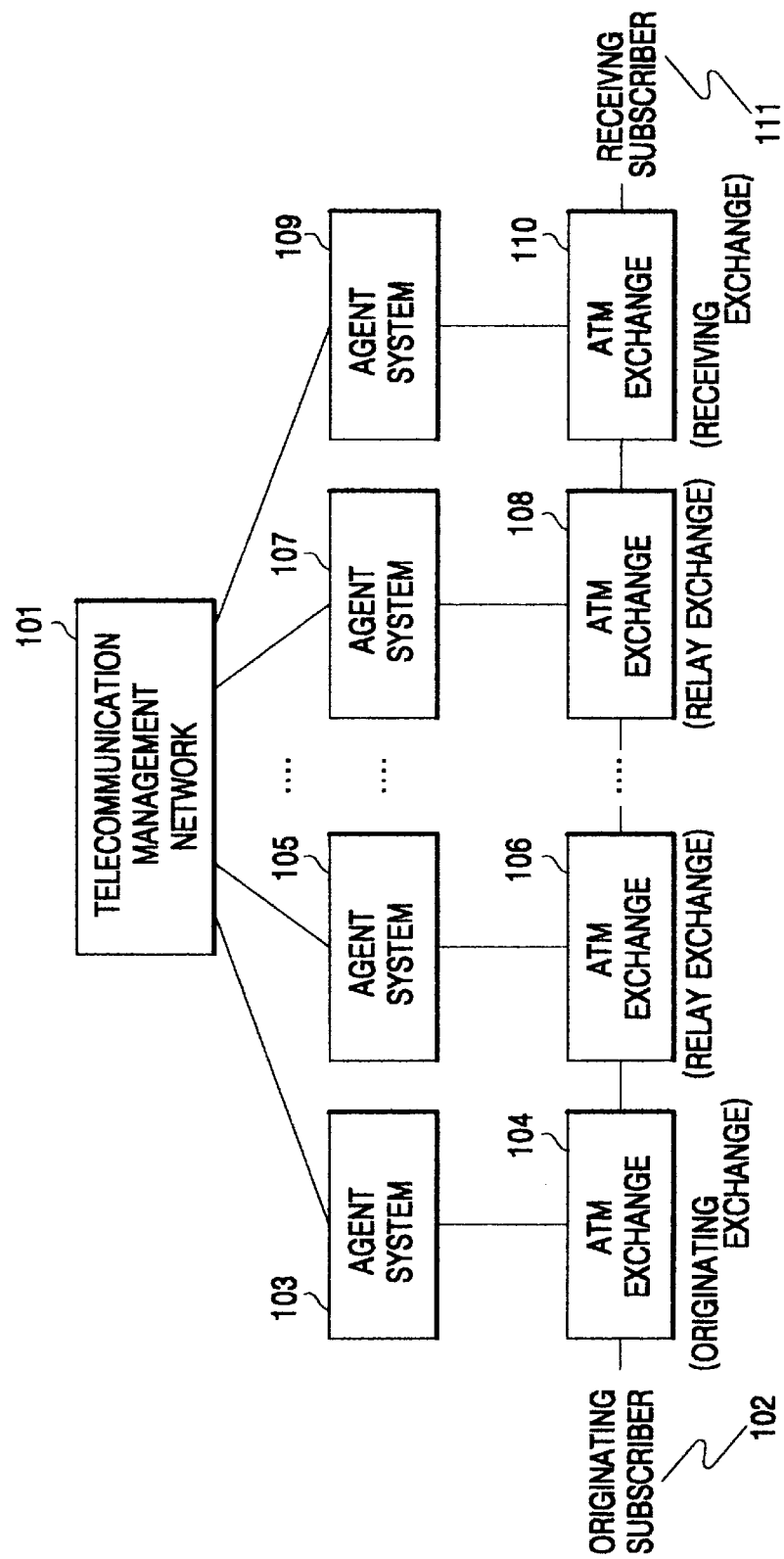
FIG. 1 is a schematic diagram showing interworking relations between the telecommunication management network manager system and the agent systems according to the present invention.

A preferred embodiment of the present invention will be described in detail by referring to the drawings attached hereto, although the invention is not so limited.

FIG. 1 is a schematic diagram showing interworking relations between the telecommunication management network manager system and the agent systems under the present invention. In the drawing, 101 is a telecommunication management network manager system. 102 is an originating subscriber. 103, 105, 107, 109 are agent systems. 104, 106, 108, 110 are ATM (asynchronous transfer mode) exchanges. 111 is a receiving subscriber.

If the telecommunication management network (TMN) manager system 101 receives a request for permanent virtual connection service, it determines an originating exchange 104 to which an originating subscriber 102 belongs and a terminating exchange 110 to which a receiving subscriber 111 belongs on the basis of its own information, and orders an agent system 103 which vicariously manages the originating exchange 104 to set up virtual connection and requests an agent system 105 which vicariously manages a transit exchange 106 to set up virtual connection on the basis of the result thereof. When several transit exchanges 106, 108 exist, it repeats such a process, and orders an agent system 109 which vicariously manages a terminating exchange 110 to set up virtual connection on the basis of the result of an order carried out by an agent system 107 which vicariously manages the last transit exchange 108 and, if it receives the result thereof, end-to-end permanent virtual connection from the originating subscriber 102 to the receiving subscriber 111 is set up.

Figure 2:
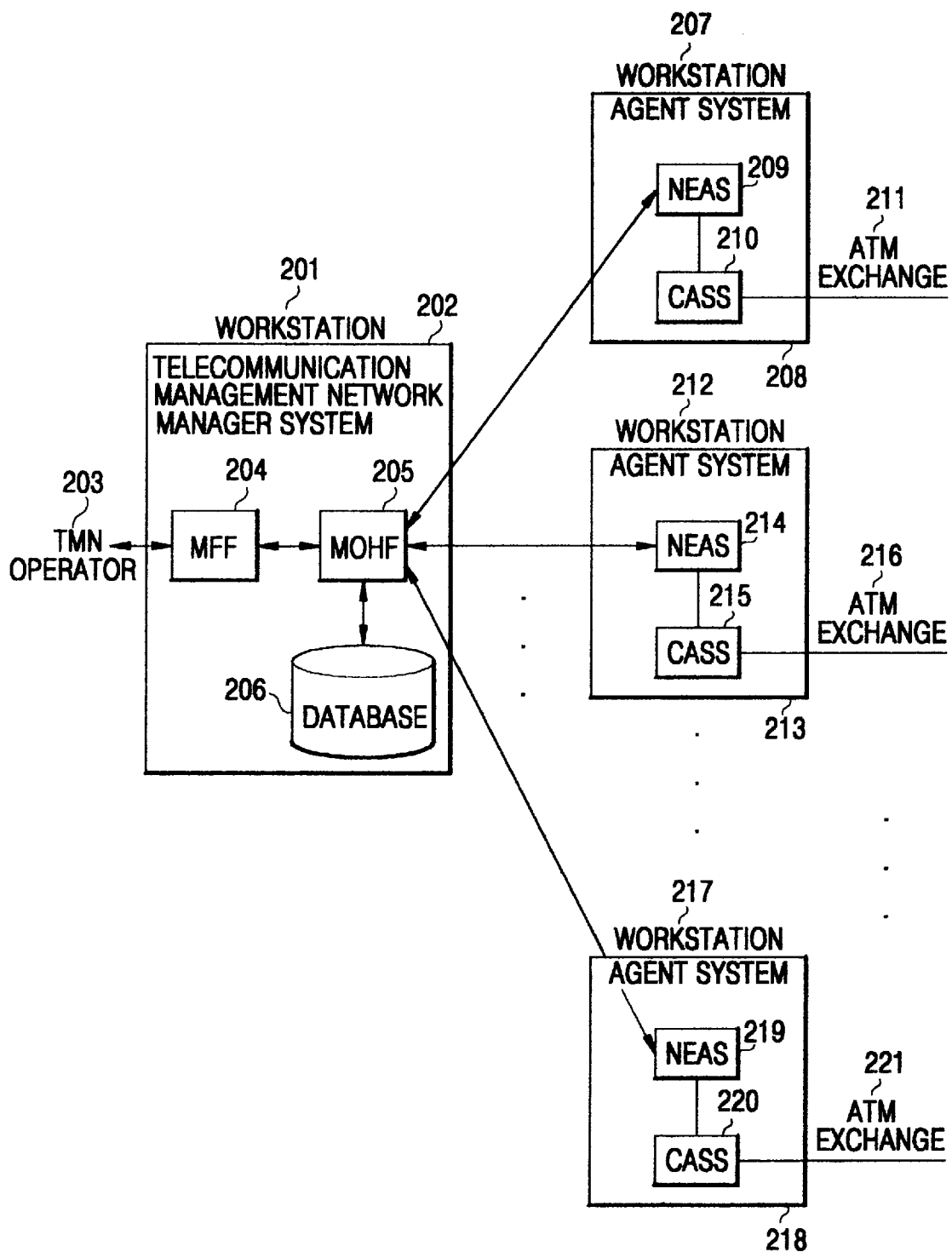
FIG. 2 is a structural diagram showing the formation of blocks and the flow of message in the telecommunication management network manager system and in the agent systems according to the present invention.

FIG. 2 is a structural diagram showing the formation of blocks and the flow of message in the telecommunication management network manager system and in the agent systems under the present invention.

If the telecommunication management network manager system 202 in a workstation 201 receives a request for permanent virtual path service from a telecommunication management network operator 203, a MFF (message forwarding function block) 204 receives input thereof and transfers it to a MOHF (manager operation handling function block) 205. The MOHF 205 finds an originating exchange 211 and a terminating exchange 221 by retrieving information in its own data base 206 and addresses a request as a first step to an agent system 208 which vicariously manages the originating exchange 211 for setup of virtual connection.

If the agent system 208 existing in another workstation 207 receives a request from the telecommunication management network manager system 202, it is inputted to an NEAS (network element agent subsystem) 209 and transferred to a CASS (connector for agent and switch subsystem) 210. The CASS 210 assembles related information and transfers it to an ATM (asynchronous transfer mode) exchange 211. A response from the ATM (asynchronous transfer mode) exchange 211 is transferred to the NEAS (network element agent subsystem) 209 through the CASS (connector for agent and switch subsystem) 210 and is transferred again to the telecommunication management network manager system 202.

The MOHF (manager operation handling function block) 205 which received the response finds a transit exchange 216 by retrieving information in its own data bass on the basis of the response message and requests it to setup virtual connection. An agent system 213 which vicariously manages the transit exchange 216 exists in a workstation 212. As described hereinabove, it receives a response from the transit exchange 216 through a NEAS (network element agent subsystem) 214 and a CASS (connector for agent and switch subsystem) 215. The MOHF (manager operation handling function block) 205 addresses a request to all the transit exchanges successively for setup of virtual connection and then to an agent system 218 which vicariously manages a terminating exchange 221 for setup of virtual connection.

The agent system 218 also exists in a separate workstation 217. It is connected with a terminating exchange 221 through a NEAS (network element agent subsystem) 219 and a CASS (connector for agent and switch subsystem) 220 and responds to the telecommunication management network manager system 202.

When all executions are completed in a normal way including an order to the agent system 218 which vicariously manages the terminating exchange, the MOHF (manager operation handling function block) 205 makes a response of success to the telecommunication management network manager 203 through the MFF (message forwarding function block) 204 and makes a response of failure if any one of those processes mentioned above fails.

Figure 3:
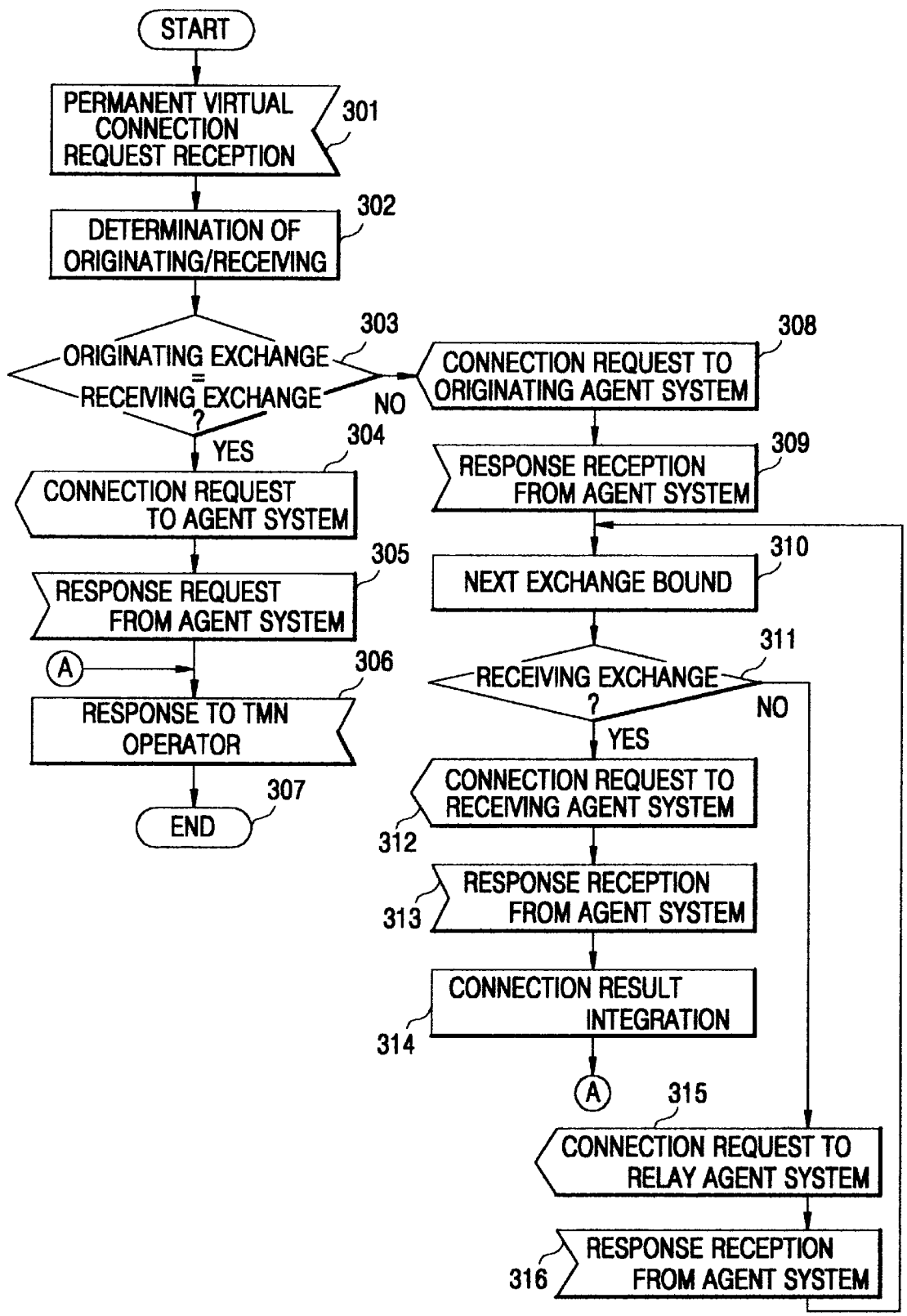
FIG. 3 is a flowchart showing a procedure for interworking with several agent systems to provide end-to-end permanent virtual path service in the telecommunication management network manager system.

FIG. 3 is a flowchart showing a procedure for interworking with several agent systems to provide end-to-end permanent virtual path service in the telecommunication management network manager system.

In step 301, the telecommunication management network manager system receives a request for permanent virtual connection from the telecommunication management network operator. Data requested at this time includes an originating subscriber number, a receiving subscriber number, a required bandwidth and a connection unit (virtual path connection or virtual channel connection).

When the telecommunication management network manager system receives a request, it retrieves information in its own data base on the basis of originating and receiving subscriber numbers and finds an exchange in step 302 to which originating subscriber belongs and an exchange to which receiving subscriber belongs. At this time, subscriber numbers accommodated by an exchange, which is the object of management, are being stored in its own data base. When it finds originating/terminating exchanges, it judges in step 303 if these two exchanges are the same. In the case where they are the same, it addresses a request to an agent system in step 304 which vicariously manages a corresponding exchange for setup of virtual connection. Data necessary for the request at this time includes an originating subscriber, a receiving subscriber number, a required band width and a connection unit. When it receives the result of connection from the agent system in step 305 , it transfers in step 306 that result to the telecommunication management network operator and comes to an end in step 307.

If the originating exchange and the terminating exchange are different as a result of judging if they are the same, the telecommunication management network manager system addresses a request in step 308 as a first step to an agent system which vicariously manages an originating exchange for setup of virtual connection. Data necessary for the request at this time includes an originating subscriber number, a receiving subscriber number, a required band width and a connection unit. A response is received in step 309 from the originating agent system. At this time, the result of the response contains an originating link number/a VPI (virtual path identifier) value and a receiving link number/a VPI value in case of virtual path connection, and contains originating/receiving link numbers, a VPI value and a VCI (virtual channel identifier) value in case of virtual channel connection. On the basis of the receiving link numbers, the telecommunication management network manager system retrieves link connection information between exchanges in its own data base and finds in step 310 an exchange connected to a corresponding link and its link number. This time, it judges in step 311 if the next exchange is a terminating exchange. When the next exchange is a terminating exchange, it addresses a request in step 312 to a receiving agent system for setup of virtual connection. Data necessary for the request at this time includes, according to a connection unit, an originating link number/a virtual path identifier value or a link number/a virtual path identifier value/a virtual channel identifier value, a receiving subscriber number, a required band width and a connection unit. If it receives a response from the receiving agent system in step 313, connections with several exchanges are achieved, so that it integrates the result of the thereof in step 314 and information and reports it in step 306 to the telecommunication management network operator and then comes to an end in step 307.

If the next exchange is not a terminating exchange as a result judgement in step 311, it is a transit exchange. In this case, the telecommunication management network manager system addresses a request in step 315 to a corresponding relay agent system for setup of virtual connection. At this time, data necessary for the request includes, according to a connection unit, an originating link number/a VPI value or a link number/a VPI value/a VCI value, a receiving subscriber number, a required bandwidth and a connection unit. When it receives a response from a relay agent system in step 316, it retrieves link connection information between the exchanges in its own data base on the basis of the result of the response and repeats its performance from the process in step 310 of finding an exchange connected to a corresponding link and its link number. The present invention is not limited to the aforesaid embodiment and the attached drawings since it is possible for those who have common knowledge in the technical field to which the present invention belongs to make replacement, transformation or alteration within the scope where it does not deviate from the technical idea of the present invention.

According to the present invention as described above, hereinabove has the following effects.

Firstly, setup of end-to-end permanent virtual connection is achieved with one instruction from a telecommunication management network operator by accommodating a request for service made by means of originating/receiving subscriber numbers in permanent virtual connection service.

Secondly, the determination of transit exchanges which passes on the path leading from the originating exchange to the terminating exchange is made dynamically by stages and every time it passes through each exchange, so that selection of the best path is made possible the moment connection is set up.

Thirdly, up to this time, the operator has had to manually designate originating/receiving links and VPI/VCI one by one for every exchange he manages. In the present invention, however, efficiency and quality of service can be improved by automatizing such manual designation.

Fourthly, since the telecommunication management network manager system manages several agent systems, it is possible to set up permanent virtual connection in centralized network center without operator's management on the spot where exchanges are set up.

Although the preferred embodiments of the present invention were disclosed in the above for illustrative purposes, those skilled in the art will appreciate that various modifications, additions and substitutions are possible without departing from the scope and spirit of the invention as disclosed in the appended claims.

What is claimed is:

1. An interworking method of a telecommunication management network (TMN) manager system and agent systems, said method comprising the steps of:

(a) creating subscriber information for exchanges managed by said TMN manager system and connection information between said exchanges so as to build up a database;

(b) receiving a permanent virtual connection request from said TMN operator, retrieving said database with originating/receiving subscriber numbers so as to determine an originating exchange and a terminating exchange, and then determining whether said originating exchange is the same as said terminating exchange;

(c) sending a request to an agent system which manages a corresponding exchange for setup of a virtual connection if said originating exchange is the same as said terminating exchange, receiving the result of said connection, and transferring the result to said TMN operator;

(d) sending a request to an originating agent system which manages said originating exchange for setup of said virtual connection if said originating exchange is different from said terminating exchange, receiving a response, retrieving link connection numbers between said originating exchange and said terminating exchange in said database with a receiving link number so as to find an exchange connected to a corresponding link and its link number, and then determining whether the found exchange is a terminating exchange;

(e) sending a request to a receiving agent system for setup of said virtual connection if the found exchange is said terminating exchange, receiving a response, and intergrating and transferring a result of the response and information to said TMN operator; and (f) sending a request to a corresponding relay agent system if the found exchange is a transit exchange, receiving a response and repeating the steps of finding the exchange and its link number as in said step (d).

2. The interworking method as claimed in claim 1, wherein the subscriber information in said step (a) includes subscriber number information accommodated by said each exchange.

3. The interworking method as claimed in claim 2, wherein said connection information between said exchanges in said step (a) includes the exchange to which itself is connected for said each exchange and its link number information.

4. The interworking method as claimed in claim 3, wherein data requested to the agent system for setup of virtual connection in said step (c) includes an originating subscriber number, a receiving subscriber number, a required bandwidth and a connection unit.

5. The interworking method as claimed in claim 4, wherein data requested to the originating agent system for setup of virtual connection in said step (d) includes an originating subscriber number, a receiving subscriber number, a required bandwidth and a connection unit.

6. The interworking method as claimed in claim 5, wherein data requested to the receiving agent system for setup of virtual connection in said step (e) includes an originating link number/a virtual path identifier value and a virtual channel identifier value, a receiving subscriber number, a required bandwidth and a connection unit.

7. The interworking method as claimed in claim 5, wherein data requested to the receiving agent system for setup of virtual connection in said step (e) includes an originating link number/a virtual path identifier value and a virtual channel identifier value, a receiving subscriber number, a required bandwidth and a connection unit.

8. The interworking method as claimed in claim 5, wherein data requested to the relay agent system for setup of virtual connection in said step (f) includes an originating link number/a virtual path identifier value and a virtual channel identifier value, a receiving subscriber number, a required bandwidth and a connection unit.

9. The interworking method as claimed in claim 5, wherein data requested to the relay agent system in said step (f) includes an originating link number/a virtual path identifier value and a virtual channel identifier value, a receiving subscriber number, a required bandwidth and a connection unit.

* * * * *